US009268141B2

(12) United States Patent
Goldenberg et al.

(10) Patent No.: US 9,268,141 B2
(45) Date of Patent: *Feb. 23, 2016

(54) DESKTOP ELECTRONIC MAGNIFIER

(71) Applicant: Freedom Scientific, Inc., St. Petersburg, FL (US)

(72) Inventors: Michael Goldenberg, Melbourne, FL (US); Bradley S. Davis, Largo, FL (US); Lee Hamilton, Tampa, FL (US); Carlos M. Rodriguez, Palm Harbor, FL (US); Patrick Murphy, Riverview, FL (US); Waldemar H. Tunkis, Palm Harbor, FL (US)

(73) Assignee: Freedom Scientific, Inc., St. Petersburg, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/143,240

(22) Filed: Dec. 30, 2013

(65) Prior Publication Data
US 2014/0184763 A1 Jul. 3, 2014

Related U.S. Application Data

(63) Continuation of application No. 13/088,674, filed on Apr. 18, 2011, now Pat. No. 8,619,133, which is a continuation of application No. 11/379,327, filed on Apr. 19, 2006, now Pat. No. 7,929,013.

(60) Provisional application No. 60/766,783, filed on Feb. 10, 2006.

(51) Int. Cl.
G02B 27/02 (2006.01)
G03B 27/32 (2006.01)
(Continued)

(52) U.S. Cl.
CPC ............ *G02B 27/027* (2013.01); *G02B 27/026* (2013.01); *G03B 27/323* (2013.01); *G06F 1/1607* (2013.01); *H04N 5/2251* (2013.01); *H04N 5/232* (2013.01); *H04N 5/247* (2013.01)

(58) Field of Classification Search
CPC .. G02B 27/026; G02B 27/027; G03B 27/323; G06F 1/1607; H04N 5/2251; H04N 5/247; H04N 5/232
USPC ............... 348/62, 63, 64, 156, 373, 375, 376; 358/474, 400, 479, 497; D16/225, 229, D16/135; 382/114
See application file for complete search history.

(56) References Cited

U.S. PATENT DOCUMENTS

D201,771 S    7/1965  Regal
3,194,223 A   7/1965  Mantzel
(Continued)

FOREIGN PATENT DOCUMENTS

EP    1524836 A    4/2005
GB    2373662 A    9/2002
(Continued)

OTHER PUBLICATIONS

Optelec, Tieman Group, ClearView Flex, User Manual, Rev. 2.0, Dec. 2005, pp. 1-16.
(Continued)

Primary Examiner — Aung S Moe
(74) Attorney, Agent, or Firm — GrayRobinson, P.A.; Michael J. Colitz, III

(57) ABSTRACT

A desktop electronic magnifier in a first embodiment includes a monitor and a control panel mounted to the monitor so that access to the control panel cannot be blocked by any position of the monitor. In a second embodiment, a monitor is positioned atop a flat platform that surmounts the camera so that access to the control panel cannot be blocked by any position of the monitor. In a third embodiment, the control panel is mounted to the camera and the monitor is supported by a support surface independent of the magnifier. Access to the control panel is blocked only if the user positions the monitor in blocking relation to the control panel.

6 Claims, 6 Drawing Sheets

(51) Int. Cl.
*G06F 1/16* (2006.01)
*H04N 5/232* (2006.01)
*H04N 5/247* (2006.01)
*H04N 5/225* (2006.01)

(56) References Cited

U.S. PATENT DOCUMENTS

| | | | |
|---|---|---|---|
| 3,521,949 A | 7/1970 | Karow et al. | |
| 3,816,646 A * | 6/1974 | Cinque | 348/63 |
| 3,997,258 A | 12/1976 | Omi | |
| 4,440,457 A | 4/1984 | Fogelman et al. | |
| 4,928,170 A | 5/1990 | Soloveychik et al. | |
| 4,963,986 A * | 10/1990 | Fukuyama et al. | 348/347 |
| D345,968 S | 4/1994 | Bruce | |
| 5,594,502 A * | 1/1997 | Bito et al. | 348/373 |
| D387,080 S | 12/1997 | Miyazawa | |
| D392,303 S | 3/1998 | Hern | |
| 5,751,355 A * | 5/1998 | Bito et al. | 348/375 |
| 5,842,672 A * | 12/1998 | Sweere et al. | 248/278.1 |
| 5,852,654 A | 12/1998 | Song | |
| 6,012,693 A * | 1/2000 | Voeller et al. | 248/280.11 |
| 6,064,426 A | 5/2000 | Waterman | |
| D428,415 S | 7/2000 | Shibata | |
| 6,115,068 A * | 9/2000 | Ariga et al. | 348/373 |
| 6,247,085 B1 | 6/2001 | Youngers | |
| 6,300,975 B1 | 10/2001 | Yamane | |
| 6,403,968 B1 | 6/2002 | Hazaki et al. | |
| 6,478,275 B1 * | 11/2002 | Huang | 248/284.1 |
| 6,731,326 B1 * | 5/2004 | Bettinardi | 348/63 |
| 6,783,105 B2 | 8/2004 | Oddsen, Jr. | |
| 6,791,600 B1 | 9/2004 | Chan | |
| D559,298 S | 1/2008 | Sukenari et al. | |
| D614,220 S | 4/2010 | Goldenberg | |
| 7,701,481 B2 | 4/2010 | Mizukami et al. | |
| 7,703,733 B2 * | 4/2010 | Price et al. | 248/288.31 |
| 7,751,092 B2 * | 7/2010 | Sambongi et al. | 358/474 |
| 7,825,949 B2 * | 11/2010 | Trulaske | 348/63 |
| D631,903 S | 2/2011 | Sugiyama | |
| 7,929,013 B2 | 4/2011 | Goldenberg et al. | |
| 7,971,840 B2 * | 7/2011 | Hirschhorn | 248/281.11 |
| 8,235,334 B1 * | 8/2012 | Kobal | 248/122.1 |
| 8,619,133 B2 * | 12/2013 | Goldenberg et al. | 348/63 |
| 8,794,579 B2 * | 8/2014 | Sturman et al. | 248/284.1 |
| 2002/0027358 A1 | 3/2002 | Peppers | |
| 2002/0144422 A1 | 10/2002 | Suhara et al. | |
| 2003/0060270 A1 | 3/2003 | Binkley et al. | |
| 2004/0036663 A1 | 2/2004 | Bevers et al. | |
| 2004/0189847 A1 | 9/2004 | Hogrebe et al. | |
| 2005/0122396 A1 | 6/2005 | Mizukami et al. | |
| 2005/0162512 A1 | 7/2005 | Seakins | |
| 2005/0162722 A1 | 7/2005 | Harris | |
| 2005/0179618 A1 | 8/2005 | Oh | |
| 2005/0201744 A1 | 9/2005 | Desorbo et al. | |
| 2006/0077286 A1 * | 4/2006 | Wenderski | F16M 11/40 348/373 |
| 2006/0158427 A1 | 7/2006 | Goldenberg et al. | |
| 2006/0203093 A1 | 9/2006 | Trulaske | |
| 2007/0292026 A1 | 12/2007 | Reznik et al. | |
| 2009/0059038 A1 | 3/2009 | Seakins et al. | |
| 2011/0074940 A1 | 3/2011 | Goldenberg et al. | |
| 2011/0141256 A1 | 6/2011 | Rodriguez et al. | |
| 2011/0194011 A1 | 8/2011 | Goldenberg et al. | |

FOREIGN PATENT DOCUMENTS

| | | |
|---|---|---|
| JP | 560119173 U | 8/1985 |
| JP | 2008301067 A | 12/2008 |
| JP | 2009253712 A | 10/2009 |
| WO | 2005101349 A | 10/2005 |

OTHER PUBLICATIONS

Optelec, Tieman Optelec, Tieman Group, ClearView Flex, User Manual, Jun. 2004 V1.0 (60 pages).

* cited by examiner

DESKTOP ELECTRONIC MAGNIFIER

CROSS REFERENCE TO RELATED APPLICATIONS

This application is a continuation of and claims priority to U.S. patent application Ser. No. 13/088,674, filed on Apr. 18, 2011, now U.S. Pat. No. 8,619,133, issued Dec. 31, 2013, and entitled "Desktop Electronic Magnifier," which itself is a continuation of and claims priority to U.S. patent application Ser. No. 11/379,327, filed on Apr. 19, 2006, now U.S. Pat. No. 7,929,013, issued Apr. 29, 2011, and entitled "Desktop Electronic Magnifier," which claims priority to U.S. Provisional Patent Application Ser. No. 60/766,783, filed on Feb. 10, 2006, and entitled "Portable Electronic Magnifier," the contents of which are fully incorporated herein for all purposes.

FIELD OF INVENTION

This invention relates to desktop electronic magnifiers. More particularly it relates to a desktop electronic magnifier having a monitor and a control panel that is mounted so that access to it cannot be blocked by the monitor.

BACKGROUND OF THE INVENTION

People with impaired vision have difficulty in reading books, perceiving small objects, or seeing fine detail. Magnifying glass has long been used to enable the perception of detail in an object or to enable the visualization of characters where such detail may be below the unaided resolution of vision of the individual. Desktop electronic magnifiers, sometimes referred to as closed circuit television devices (cctv) have now largely supplanted magnifying glass. These devices employ a camera having CMOS technology for generating an enlarged or magnified image of the object. The user is then able to view an enlarged image of the object as it is displayed on a monitor.

Currently available desktop electronic magnifiers have a number of limitations. One important limitation is that the controls for the magnifier are often located either on the table of the unit where the item to be magnified is placed. When mounted to the table of the unit, the monitor may block access to the control panel. Moreover, such an assembly is complex because the electrical wiring must pass through the table up to the camera. A need therefore exists for a desktop electronic magnifier where the length of the electrical wiring between the camera and the control panel is minimized and where the control panel can be accessed for all or almost all positions of the monitor.

SUMMARY OF INVENTION

The long-standing but heretofore unfulfilled need for an improved desktop electronic magnifier is now met by a new, useful, and non-obvious invention. The novel apparatus includes a table adapted to support an object and a camera mounted above the table. The camera is adapted to view the object and to provide an enlarged image of the object. A monitor is in electrical communication with the camera, and is adapted to display the enlarged image of the object to facilitate viewing of the object by a person having low vision.

In a first embodiment, a support arm is secured to a rearward side of the table. The support arm has a first upstanding part and a second part extending forwardly relative to the rearward side of the table. The camera is positioned in vertically spaced relation to the table, upwardly thereof. More particularly, the camera is rigidly mounted to the support arm and thus has a fixed position. A rigid link interconnects the monitor and the support arm. The rigid link has a rearward end pivotally secured to the support arm and a forward end pivotally secured to the monitor. The control panel for controlling operation of the camera is fixedly mounted to the forward end of the monitor in underlying relation thereto so that movement of the monitor effects simultaneous and corresponding movement of the control panel. Accordingly, the monitor cannot block access to the control panel. Movement of the control panel conjointly with movement of the monitor offers a great deal of flexibility to the user of the system. A user may sit near the monitor and still be able to adjust the control buttons on the control panel. This eliminates the problems caused by prior art structures where the control panel is fixed to a reading table or a platform. A control panel affixed to a reading table is impractical when the monitor is positioned an uncomfortable distance from the table. The novel mounting also minimizes the length of the wiring between the control panel and the camera. The novel mounting further provides an expandable system that allows the connection of several accessories using a video multiplexer or VMX. The VMX can be mounted to the desktop electronic magnifier at any suitable location including the support arm. The VMX inputs data from a distance viewing camera, the desktop electronic magnifier, and a computer VGA output. The VMX outputs to the monitor, which may provide an LCD or CRT display, any combination of the incoming signals and can apply video enhancements to those signals.

In a second embodiment, a flat platform is mounted atop the camera and the control panel is fixedly mounted to a forward end of the camera in underlying relation to the flat platform. Unobstructed user access to the control panel is provided for any position of the monitor atop the flat platform.

In a third embodiment, the upstanding support arm has an upstanding part and a horizontal part extending over the table in parallel relation thereto. The camera is rigidly mounted to the horizontal part of the support arm. A support surface for supporting the monitor is independent of the desktop electronic magnifier. The control panel is fixedly mounted to a forward end of the camera so that unobstructed user access to the control panel is provided for any position of the monitor atop the support surface that does not block the access. In all embodiments, the novel desktop electronic magnifier uses an integrated universal power supply that allows it to be plugged into directly into the wall in any region of the world.

The control panel enables a user to control parameters of the magnifier including turning the camera unit on and off, selecting the color mode for the display, adjusting the magnification of the display, locking the focus, adjusting the brightness and turning a position locator beam on and off. Thus it is understood that the primary advantages of the invention are that the monitor does not block access to the control panel and that the length of the wiring from the camera to the control panel is minimized.

BRIEF DESCRIPTION OF THE DRAWINGS

For a fuller understanding of the nature and objects of the invention, reference should be made to the following detailed description, taken in connection with the accompanying drawings, in which.

DETAILED DESCRIPTION OF THE PREFERRED EMBODIMENT

Figure 1:
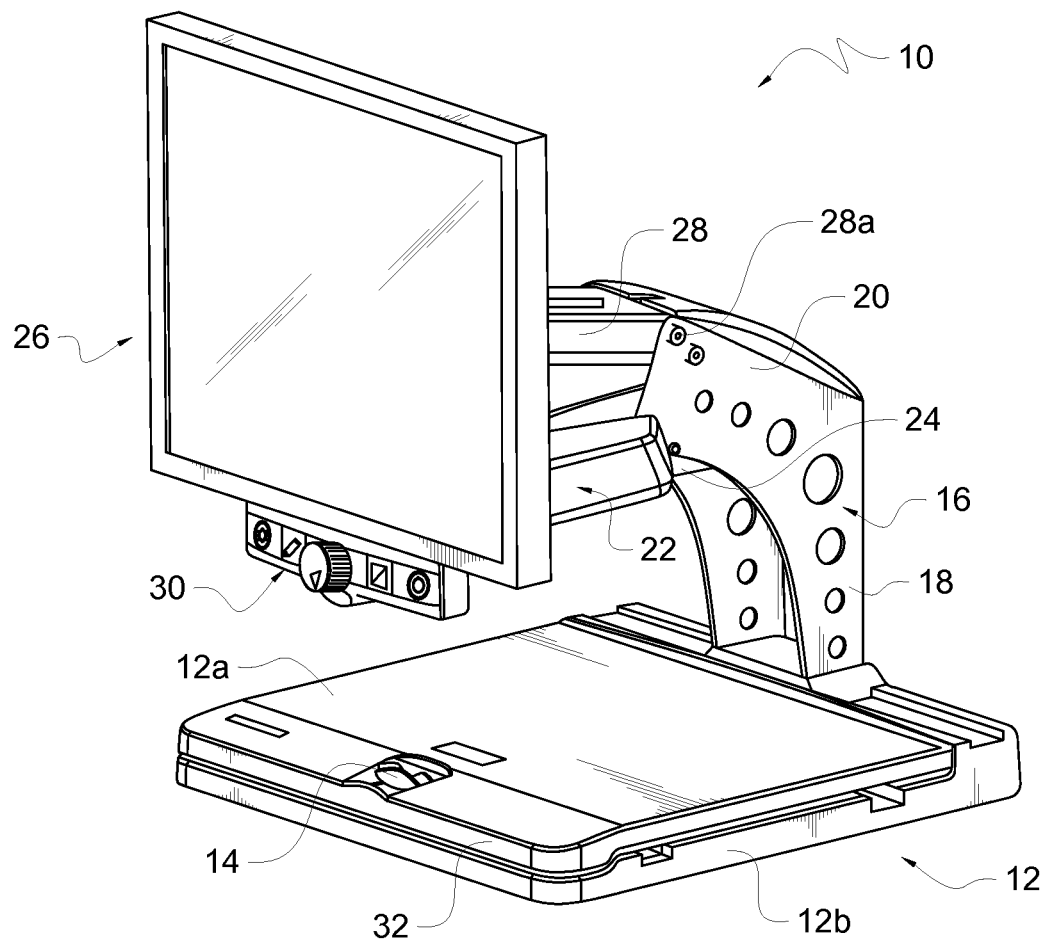
FIG. 1 is a front perspective view of a first embodiment of the novel desktop electronic magnifier.
Figure 2:
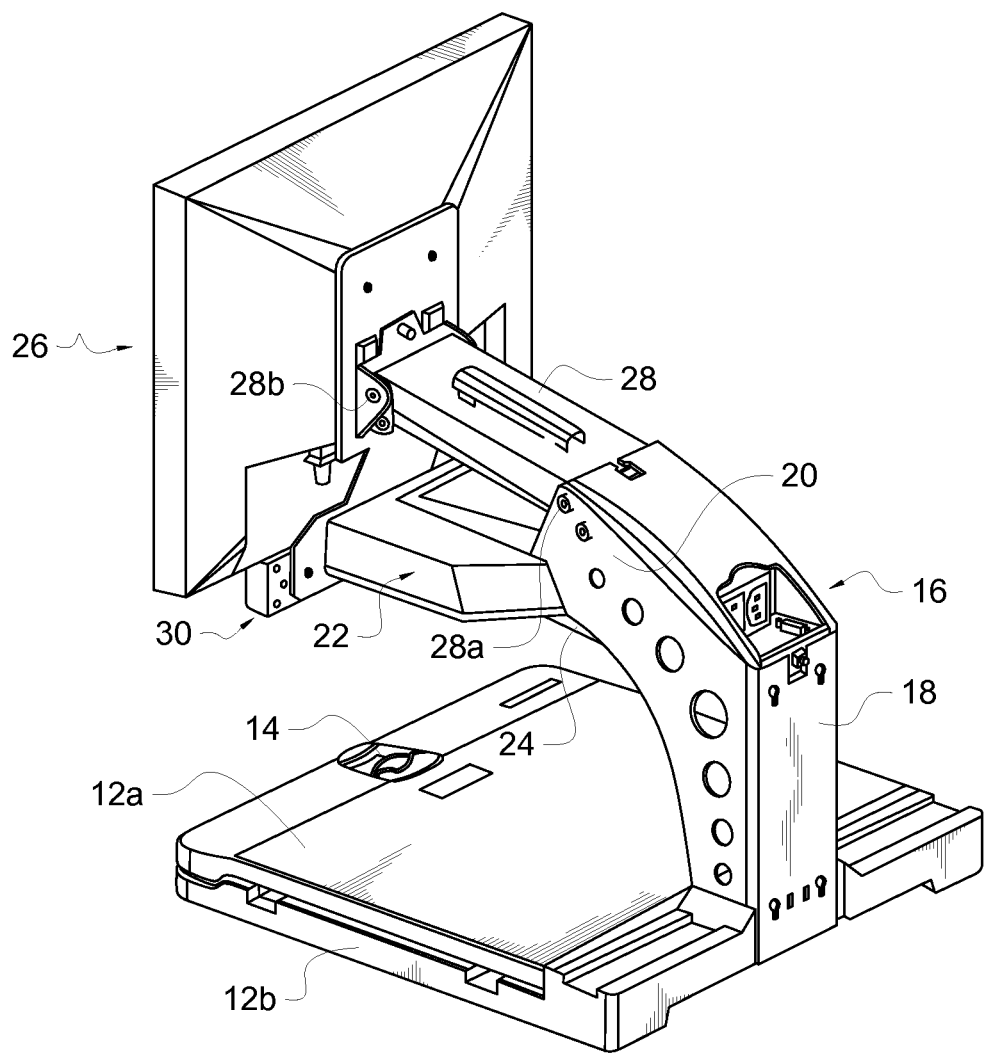
FIG. 2 is a rear perspective view of the embodiment depicted in FIG. 1.

Referring now to FIGS. 1 and 2, it will there be seen that an illustrative embodiment of the invention is denoted as a whole by the reference numeral 10. Desktop electronic magnifier 10 includes a base in the form of table 12 adapted to support an item to be magnified. Table 12 is also referred to as an X-Y table or a glide table because it is mounted for sliding movement along an x-axis, i.e. to the left and right, and along a y-axis, i.e., toward or away from a user. More particularly, the table includes top part 12a that is movably mounted and a lower part 12b that has a fixed position. An item to be magnified is placed atop top part 12a and said top part is moved relative to fixed position part 12b as needed to bring the item into the viewing field of a video camera that is positioned above table 12.

Lock 14 is a variable braking mechanism that enables a user to control the amount of resistance to movement of table top part 12a relative to bottom part 12b. When disengaged, top part 12a is easily displaced. Sliding lock 14 away from its disengaged position gradually increases the resistance. Lock 14 is moved to its fully locked position when the user desires to lock top part 12a into a particular position.

Rigid support arm 16 is secured to a rearward side of the bottom part of table 12. Support arm 16 has an upstanding lower part 18 formed integrally with an upper part 20 that extends forwardly relative to said rearward side. Video camera 22, best depicted in FIG. 2, is connected to the bottom of forwardly extending part 20 by rigid link 24 that engages said video camera at its forward or leading end and said forwardly extending part 20 at its rearward end. Significantly, video camera 22 is not mounted for movement.

In this first embodiment, monitor 26 is pivotally mounted to support arm 16. Rigid link 28 has a rearward end pivotally connected as at 28a to the top of forwardly extending part 20 and a forward end pivotally connected as at 28b to a bracket secured to the back of monitor 26 as depicted. Monitor 26 is therefore raised with respect to table 12 or lowered with respect thereto by rotating rigid link 28 relative to rearward pivot point 28a and monitor 26 is pivotal about forward pivot point 28b so that it may be maintained in a vertical plane as its height is adjusted.

Rigid link 28 could also be provided in telescoping form so that a user could pull monitor 26 forwardly toward the user or push it away in a rearward direction. Moreover, pivot point 28b may be replaced with a universal joint to enable rotation of monitor 26 about a vertical axis.

Control panel 30 is removably mounted to a bottom edge of monitor 26. More particularly, it is mounted to a bracket that holds the monitor. Control panel 30 therefore moves conjointly with monitor 26 and access to said control panel cannot be blocked by the monitor. For example, if control panel 30 were mounted to front edge 32 of table top 12a, as taught by the prior art, it becomes inaccessible when monitor 26 is brought into a forward, fully lowered position. Similarly, as also taught by the prior art, if control panel 30 were mounted to a leading edge of video camera 22, it would easily be obscured and rendered inaccessible whenever monitor 26 is lowered below the plane of the video camera.

Control panel 30 is preferably secured to monitor mounting bracket 32 (FIG. 2) although there are numerous ways to make the connection and all of such ways are within the scope of this invention. Control panel 30 could also be secured to the top edge of monitor 26 or to either of its side edges. Accordingly, monitor 26 is positionable independently of video camera 22. Camera 22 includes a position locator beam, light or other pointing device (not depicted) that points down to table 12 to enable a user to more accurately position the item to be magnified.

Figure 3:
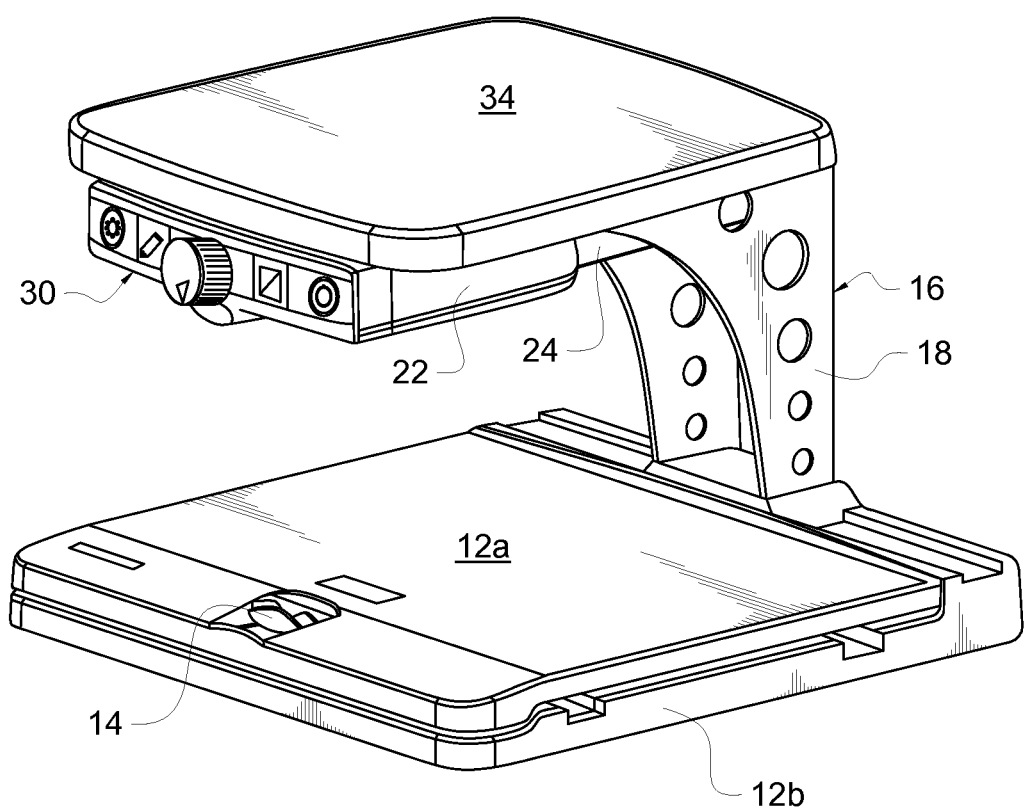
FIG. 3 is a front perspective view of a second embodiment.
Figure 4:
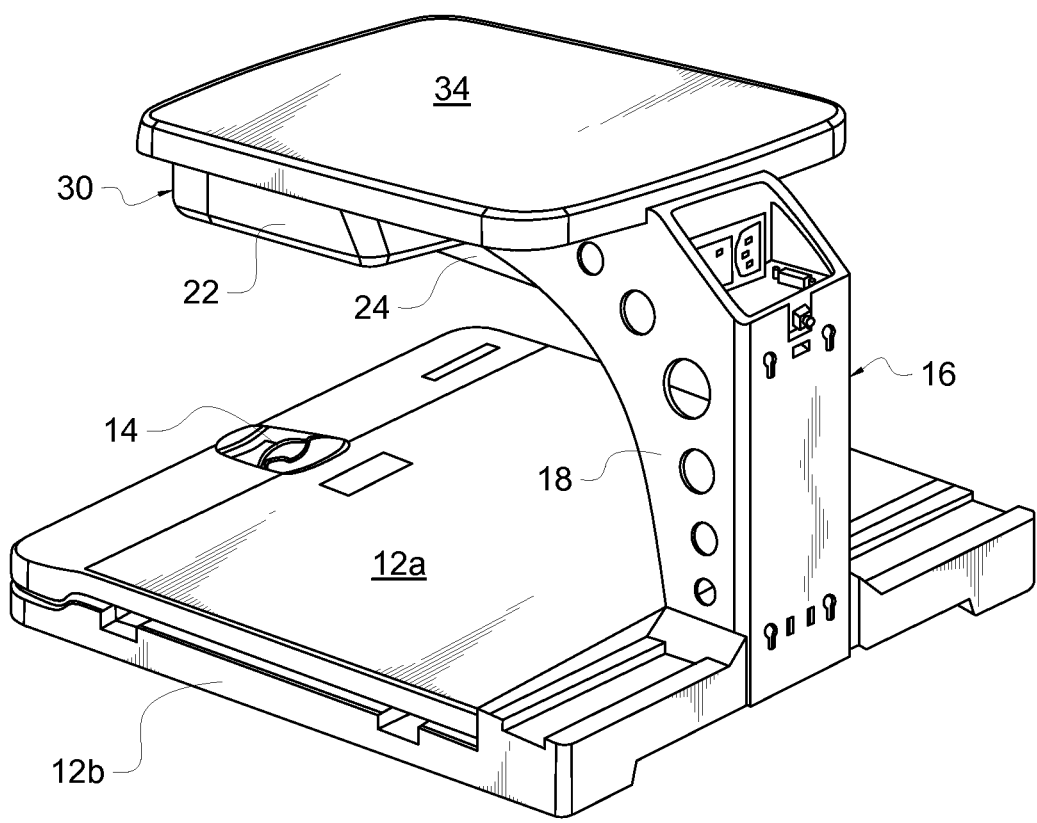
FIG. 4 is a rear perspective view of the embodiment depicted in FIG. 3.

In the embodiment of FIGS. 3 and 4, control panel 30 is removably secured to a leading edge of fixed position camera 22. This minimizes the length of the electrical conductors that extend between the camera and the control panel. Rigid link 24 secures camera 22 to support arm 16 as in the first embodiment but no link is provided to interconnect monitor 26 to said support arm. Instead, flat monitor platform 34 surmounts video camera 22 and is fixedly secured thereto. A monitor is positioned at any location and orientation atop platform 34. The monitor may be slid atop the flat surface of platform 34 and thereby adjusted in two dimensions as desired by the user. Since the monitor, not depicted, is restricted to the top of platform 34, it cannot obstruct control panel 30.

Figure 5:
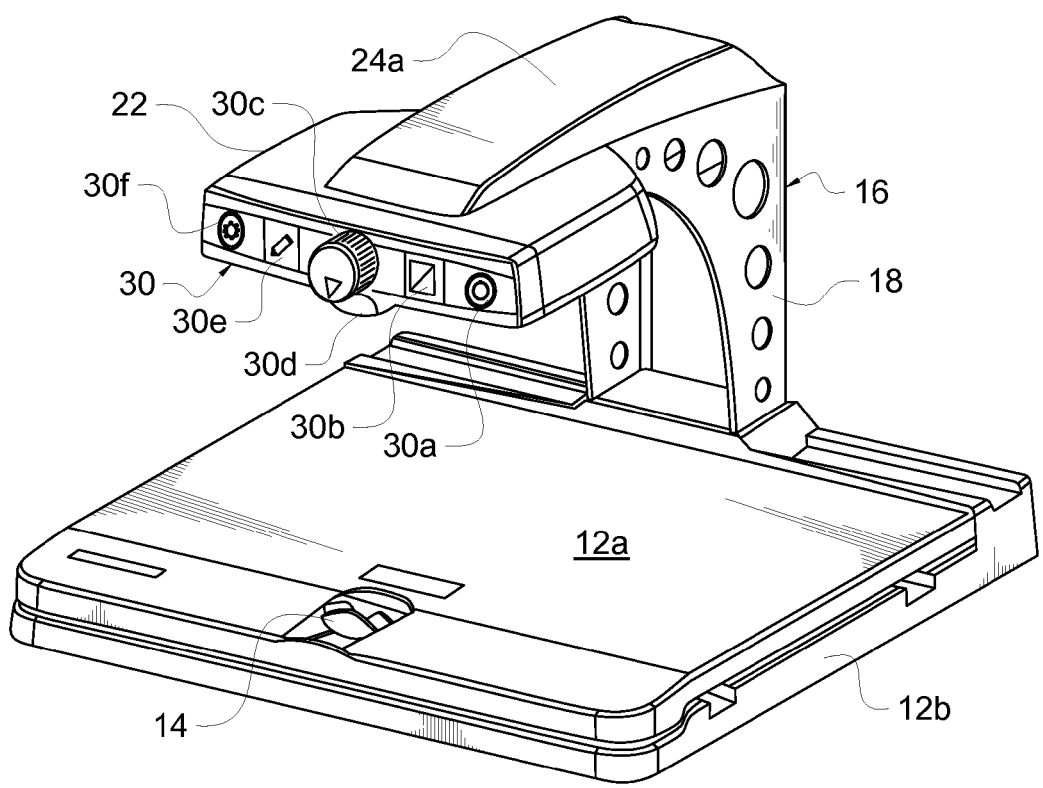
FIG. 5 is a front perspective view of a third embodiment.
Figure 6:
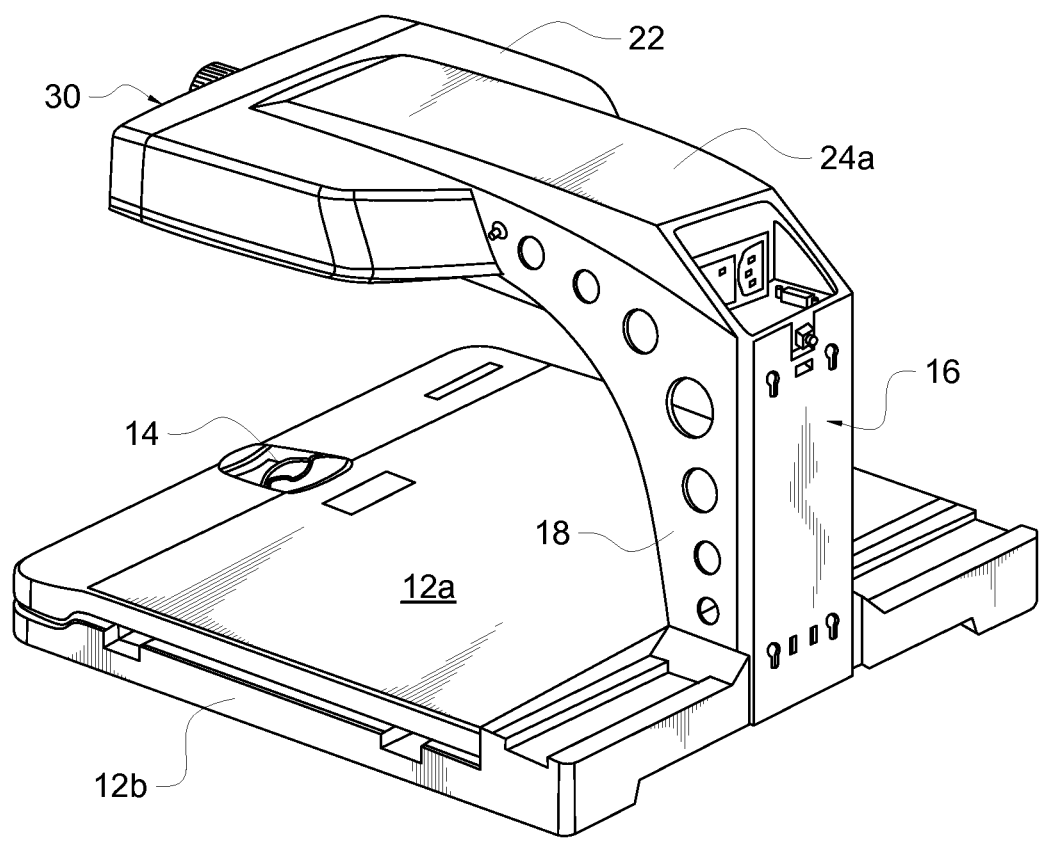
FIG. 6 is a rear perspective view of the embodiment depicted in FIG. 5.

A third embodiment is depicted in FIGS. 5 and 6. This embodiment provides no platform to support an independent monitor as in the second embodiment. Instead, the user places an independent monitor atop the same desktop or other support surface upon which desktop electronic magnifier 10 is supported. In this way, the user is free to position the monitor in any desired location relative to the magnifier and access to control panel 30 is blocked only if the user places the monitor in front of table 12. In this embodiment, the function of link 24 is performed by cantilever arm 24a that extends in cantilevered relation to an upper end of support arm 16. Video camera 22 is suspended from a free end of said cantilevered arm as depicted, and control panel 30 is removably mounted to the leading end of video camera 22. As in the second embodiment, this minimizes the length of the electrical conductors that provide electrical communication between the control panel and the camera.

In all embodiments, but as indicated only in FIG. 5, control panel 30 includes control 30a to turn video camera 22 on and off, control 30b to select the color mode for the display, control 30c to adjust the magnification of the display, control 30d to turn the position locator beam on and off, control 30e to lock the focus, and control 30f to adjust the brightness.

In all embodiments, control panel 30 may be connected to camera 22 by electrical conductors or the connection may be wireless to provide additional flexibility. It should also be noted that the control panel and camera unit are modular units, i.e., they are interchangeable between the three embodiments.

It will thus be seen that the objects set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. A desktop electronic magnifier for use by a blind or low vision user, the desktop electronic magnifier comprising:
   a base including a glide table, the glide table having a top part and a lower part, the top part being moveably mounted to the lower part, the lower part having a fixed position, wherein the top part is adapted for receiving an object;
   a lock for controlling a resistance between the top part and the lower part, the resistance being continuously variable;
   a support arm secured to the lower part of the glide table;
   a video camera fixedly connected to the support arm, the video camera having a viewing field above the glide table and including a light for illuminating the glide table;
   a telescopic link having a first end and a second end, the telescopic link positioned above both the support arm and the video camera, the first end of the link pivotally connected to the support arm about a horizontal axis;
   a monitor pivotally mounted to the second end of the telescopic link about a vertical axis, the monitor having a screen and at least one edge, the screen adapted for viewing the object placed within the viewing field of the video camera; and
   a control panel removeably mounted proximate to the at least one edge of the monitor, the control panel including independent controls for at least one of color mode, magnification, focus lock, and brightness, wherein the control panel is in wireless communication with the video camera.

2. An electronic magnifier for use by a blind or low vision user, the electronic magnifier comprising:
   a base including a glide table, the glide table having a top part and a lower part, the top part being moveably mounted to the lower part, the lower part having a fixed position, wherein the top part is adapted for receiving an object;
   a lock for controlling a resistance between the top part and the lower part, the resistance being continuously variable;
   a support arm secured to the lower part of the guide table;
   a video camera fixedly connected to the support arm, the video camera having a viewing field above the glide table;
   a flat monitor platform secured to the support arm for receiving a monitor for displaying the object; and
   a control panel removeably secured to a leading edge of the fixed video camera.

3. The electronic magnifier as described in claim 2, wherein the control panel is in wireless communication with the video camera.

4. The electronic magnifier as described in claim 3, wherein the control panel includes independent controls for at least one of color mode, magnification, focus lock, and brightness.

5. The electronic magnifier as described in claim 2, further comprising a light for illuminating the glide table.

6. The electronic magnifier as described in claim 2, wherein the flat monitor platform is substantially parallel to the base.

* * * * *